Figure 1:
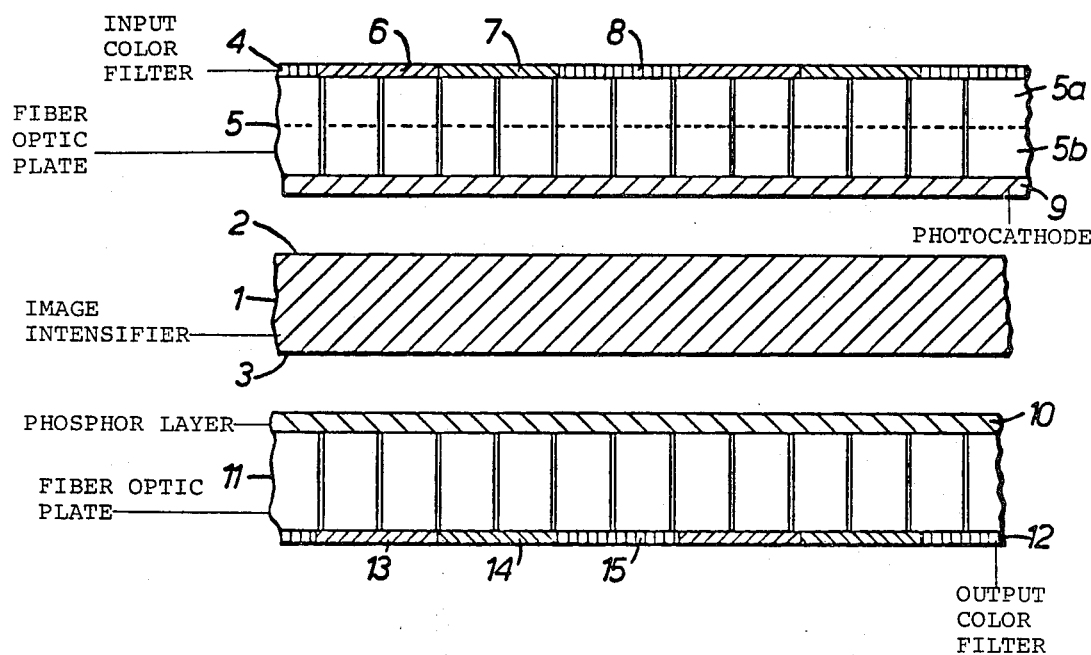

United States Patent [19]

Howorth

[11] 4,374,325

[45] Feb. 15, 1983

[54] IMAGE INTENSIFIER ARRANGEMENT WITH AN IN SITU FORMED OUTPUT FILTER

[75] Inventor: Jonathan R. Howorth, Maldon, England

[73] Assignee: English Electric Valve Company Limited, Chelmsford, England

[21] Appl. No.: 168,339

[22] Filed: Jul. 11, 1980

[30] Foreign Application Priority Data

Jul. 11, 1979 [GB] United Kingdom ................ 7924200

[51] Int. Cl.³ ............................................. H01J 31/50
[52] U.S. Cl. ................................. 250/213 VT; 313/94
[58] Field of Search ...................... 250/213 R, 213 VT; 313/94, 103 R, 387; 315/10–11, 12 R

[56] References Cited

U.S. PATENT DOCUMENTS 3,231,746 1/1966 Goodrich ...................... 250/213 VT
3,267,283 8/1966 Kapany ........................ 250/213 VT
3,863,093 1/1975 Orthuber ................. 250/213 VT X

FOREIGN PATENT DOCUMENTS 783812 10/1957 United Kingdom .
1325125 8/1973 United Kingdom .
1493307 11/1977 United Kingdom .

Primary Examiner—David C. Nelms
Assistant Examiner—Edward P. Westin
Attorney, Agent, or Firm—Spencer & Kaye

[57] ABSTRACT

An image intensifier device is provided with color filters on its input and output surfaces so as to intensify a color image without losing the color content. Each filter consists of an array of red, green and blue elements and these elements are precisely aligned in both input and output filters to avoid degradation of the color content. A method of producing the output filter in situ is described to provide the required accuracy of alignment.

5 Claims, 4 Drawing Figures

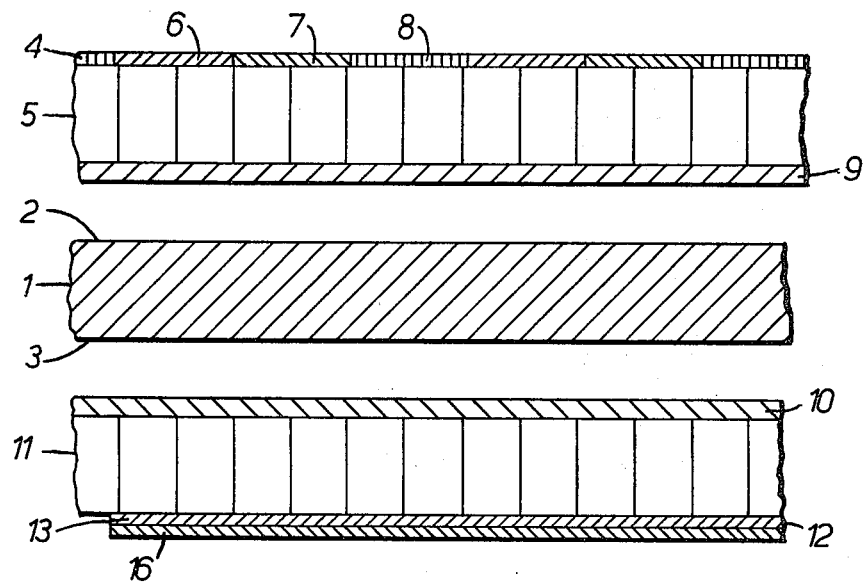
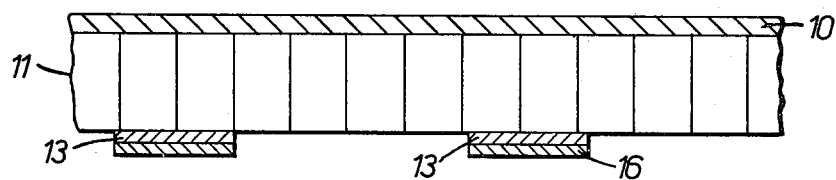
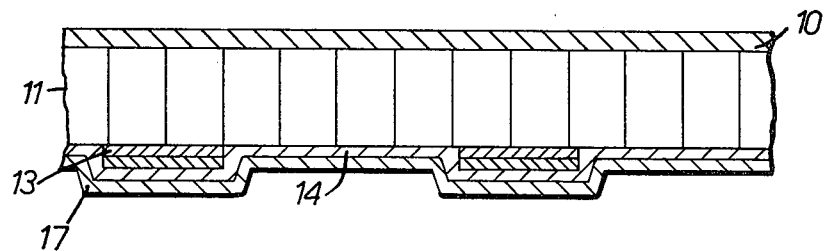
FIG. 2.
FIG. 3.
FIG. 4.

IMAGE INTENSIFIER ARRANGEMENT WITH AN IN SITU FORMED OUTPUT FILTER

This invention relates to image intensifier arrangements by means of which the intensity of a relatively low level optical image can be greatly increased. Intensifier arrangements of this kind are generally insensitive to colour—that is to say the image intensifier enhances only the intensity of a received image, and if a colour image is presented to it the colour content of the image is lost. The expedient of using a number of separate intensifiers is undesirable as it would result in an excessively expensive and cumbersome system, and moreover would require the use of additional optical surfaces to separate out and then recombine the different colours. In image intensifier arrangements which receive optical images at very low levels of illumination, the number of optical reflecting or transmitting surfaces must be kept to an absolute minimum to avoid unnecessary optical attenuation of the wanted image. The present invention seeks to provide an image intensifier arrangement which is capable of preserving the colour content of an optical image presented to it.

According to this invention an image intensifier arrangement includes an image intensifier device arranged to receive an incident optical image at an input surface thereof, and to produce in response thereto a re-constituted optical image of greater intensity at an output surface thereof; two optical filters each having a plurality of adjacent co-planar colour selective elements of at least two colours, one of said filters being an input filter located adjacent to said input surface in an image receiving path, and the other of said filters being an output filter located adjacent to said output surface in an output optical path, the two filters being so arranged that light for corresponding points in the incident image and the re-constituted image passes through corresponding colour selective elements in the respective filters.

The invention is particularly suitable for intensifying the very low intensity of an image obtained from a scene illuminated, for example, only by natural starlight.

Since the sensitivity of an image intensifier is partly derived from the fact that the photocathode responds to near infra-red radiation (400–900 nanometers) part of which is invisible to the human eye, the use of corresponding filters of similar colour on input and output surfaces may result in either a loss of efficiency if it is chosen to cut out the infra-red radiation, or alternatively a very red picture if the infra-red is included. In practice, therefore, corresponding filters of dissimilar colours will be chosen, such that despite the infra-red response of the photocathode, and possibly imperfect whiteness of the phosphor, an acceptable colour rendition is achieved.

Preferably each filter includes colour selective elements of three colours. Preferably they are the three primary colours red, blue and green for the output filter, and preferably again they are three colours having wavelengths lying in the range 400 to 900 nanometers for the input filter.

Preferably each filter is formed on one surface of a thin fibre optic plate in which the individual fibres extend from said surface to an opposite major surface. Preferably again in the case of the input optical filter, a thin layer of photocathode material is located at said input surface of said image intensifier device and is present on one surface of a further thin fibre optic plate, the opposite surface of which is in contact with said opposite surface of the fibre optic plate which carries the input filter. Preferably again in the case of the output filter a fluorescent screen is provided on said opposite major surface of the fibre optic plate. Conveniently the fluorescent screen consists of a high efficient phosphor.

So as to ensure that the respective colour filter elements of the input filter and output filter are precisely optically aligned, preferably at least one of these filters is formed in situ after the image intensifier arrangement has been assembled. To enable the image forming properties of the system to be conveniently used for this purpose, preferably it is the output filter which is formed in situ.

Preferably again, the positions of the individual colour filter elements are defined by illuminating the input filter sequentially with light of different primary colours which is selectively passed by filter elements of a single corresponding colour, so as to produce at the output filter a re-constituted image of the individual filter elements of the input filter. From this re-constituted image, the individual filter elements of the output filter can be produced by photolithographic techniques.

The invention is further described by way of example with reference to the accompanying drawings in which, FIG. 1 shows a section view through an image intensifier system in accordance with the present invention, and FIGS. 2, 3 and 4 illustrate different stages in the production of the optical filters.

Referring to FIG. 1, an image intensifier system is shown which includes an image intensifier device 1. This device 1 is one which provides amplification for an electron or charge image formed on its input surface 2, and produces a greatly amplified charge or electron image at its output surface 3. Conveniently the image intensifier device 1 may take the form of a micro-channel plate amplifier. Devices of this kind are well known and briefly they consist of a thin flat plate of glass having a very large number of hollow channels extending from an input surface to an output surface. Electrons which enter the input end of each channel are multiplied by a secondary electron process so that a very much larger number of electrons is emitted from the output end of each channel. Because each channel is of an extremely small diameter, a very fine image resolution can be produced and because electrons do not travel from one channel to another, the effect of cross talk is minimised.

However, conventional image intensifiers using several dynode stages could be used if desired. Conventional cascade image intensifier systems where two or more individual image intensifiers are fibre optically coupled together could also be used.

The requirement often arises to intensify a low light optical image and this can be conveniently achieved by converting the optical image to a corresponding electron image which can be amplified by the image intensifier device 1. When the original optical image is converted to the corresponding electron image only the information corresponding to the variation in the intensity of illumination is retained as variations in the charge distribution of the electron image. Information relating to the colour of the original optical image is lost in conventional image intensifier systems.

To enable the colour information to be retained, an input optical filter 4 is provided and is mounted on the input surface of a fibre optic plate 5. The filter 4 consists of colour elements 6, 7 and 8, which are co-planar and aligned side by side. Each element may be a thin continuous stripe of coloured gelatine or a multi-layer dielectric material, or instead may consist of, for example, an array of coloured hexagons or squares, such that the different colours are regularly distributed across the input surface of the fibre optic plate 5. The filter 4 is formed on a fibre optic plate 5 since the filter itself is composed of a relatively weak gelatine or dielectric film which must be firmly supported. A fibre optic plate is used rather than a simple slab of glass in order to prevent image spreading and undesirable cross talk occurring between adjacent filter elements. Light passed by the different filter elements is conducted along the individual fibres of the plate 5 to a thin photocathode layer 9. For reasons of economy of manufacture, it may be desirable to form the filter elements 6, 7 and 8 on a separate fibre optic plate 5a which can be optically cemented to the face plate 5b which forms part of the image intensifier, after the image intensifier has been manufactured and tested. The photocathode 9 thus produces electrons which are related to the intensity of the different colours received by it and the electron image so formed is greatly amplified by means of the image intensifier device 1.

The amplified electron image emitted by the surface 3 is received by a continuous phosphor screen 10. The phosphor screen consists of a thin layer of high efficiency phosphor deposited on one surface of a further fibre optic plate 11. In response to the incident electrons, the phosphor layer 10 produces a corresponding optical image having an intensity distribution which corresponds to the charge distribution of the electron image which produces it. It is arranged that the phosphor produces a substantially white light output by using either a single phosphor or mixture of phosphors which encompasses the colour range of the three filter elements 6, 7 and 8. The phosphor layer 10 is formed on one surface of the fibre optic plate 11, since it is a relatively fragile layer which requires a strong rigid support. Generally, the phosphor layer will be produced upon the plate 11 by sedimentation from an aqueous suspension. The other surface of the plate 11 carries a further optical filter 12 consisting of individual filter elements 13, 14 and 15 which correspond exactly to the distribution of the elements of filter 4. In this way a much brighter re-constituted image is formed which is almost identical to the very low level incident image received by the filter 4.

In practice the image intensifier system so far described would be mounted inside a vacuum envelope since, of course, this is essential for the operation of the image intensifier device 1, which amplifies the electron image.

The size of each filter element should be greater than the individual diameter of the optical fibres of the fibre optic plate 5 on which they are formed so that most of the fibres carry only light of a single colour. Clearly where the boundary between adjacent filter elements crosses a particular fibre that fibre will carry a combination of colours, but is is expected that this will produce negligble degradation in the new constituted image. To preserve the correct colour balance of the optical image, it is important that corresponding portions of the incident and reconstituted images should be associated with filter elements of the same or corresponding colour. One method of producing the optical filters 4 and 12 so as to enable this requirement to be satisfied is described with reference to FIGS. 2, 3 and 4, which illustrate different stages in the process. In these Figures, the same reference numerals are used as in FIG. 1, where this is appropriate.

Referring to FIG. 2, the image intensifier system is as illustrated in FIG. 1 except that the lower fibre optic plate 11 initially carries a colour filter 12 which is a single continuous layer of one colour—in this case a red filter —the outer surface of which is covered by a film 16 of positive photo-resist material. The upper surface of the filter 4 is illuminated with the red light which corresponds to the light transmissive bandwidth of the red filter elements 6. Thus photoelectrons are emitted from the photocathode 9 at only those portions which receive red light from the red pass filter elements 6. Each individual element will be refocused on the phosphor screen 10 in exact registration and light emitted by the phosphor screen is used to define the required locations of the red filter elements 13. The thin film of positive photo resist 16 which is present on the outer surface of the optical filter 12 responds to the red light and only those regions of the photo resist which receive light from the phosphor screen 10 will be developed or hardened. Subsequently, the unexposed portions of the photo resist film 16 are removed. Those regions of the red filter not protected by the remaining portions of exposed photo resist material are removed by means of a suitable etchant leaving isolated stripes or islands of red filter elements. This is illustrated in FIG. 3 and whether stripes or islands are produced, will depend, of course, on the nature of the pattern of the colour filter elements of optical filter 4. As previously mentioned, it is expected that stripes will be more convenient to produce.

Subsequently, as shown in FIG. 4, a layer of blue filter material 14 is coated over the whole of the lower surface of the fibre optic plate 11 and also over the red filter elements 13 which have already been formed. Subsequently a continuous layer 17 of photo-resist material is applied over the blue filter material 14, and the input surface of filter 4 is then illuminated with blue light. The process is repeated so as to produce isolated stripes or islands of blue filter elements 14, where required. Finally, the green filter elements are formed by an analogous process to produce a completed optical filter 12 consisting of individual filter elements 13, 14 and 15 of the required colours. It will be noted that the exposed and hardened regions of photo-resist remain, and therefore should be of a transparent material so as not to degrade the optical intensity of the re-constituted image. Because of the self aligning technique which is used to produce the optical filter 12, the individual filter elements will be exactly aligned with corresponding elements in the filter 4.

Precise alignment is required if the resolution and colour content of a low light image are to be preserved. For example, the diameter of the individual optical fibres will be typically about 6 $\mu$m and the width of each strip of the filter elements will be typically about 10 $\mu$m, so that the theoretical resolution is much better than that which can be easily resolved by the eye, e.g. which is about 30 $\mu$m. This indicates that very precise fabrication techniques are required.

I claim:

1. A method of forming the output filter of an image intensifier arrangement including an image intensifier device arranged to receive an incident optical image at an input surface thereof and, in response thereto, to produce a re-constituted optical image of greater intensity at an output surface thereof, two optical filters each having a plurality of adjacent co-planar colour selective elements of at least two colours with one of said filters being an input filter located adjacent to said input surface in an image receiving path and the other of said filters being an output filter located adjacent to said output surface in an output optical path, and with said two filters being so arranged that light for corresponding points in the incident image and the re-constituted image passes through corresponding colour selective elements in the respective filters; said method including: after the image intensifier device and the input filter have been assembled, defining the positions of the individual colour selective filter elements of the output filter by illuminating the input filter sequentially with light of different colours which are selectively passed by filter elements of a corresponding colour, so as to produce at said output surface a re-constituted image of the individual filter elements of said input filter; and utilizing the re-constituted image to produce said output filter in situ at said output surface.

2. A method as claimed in claim 1 wherein colour selective elements of a particular colour of the output filter are formed by steps which include: producing at said output surface a continuous thin layer of filter material of said particular colour; illuminating said input filter with a colour corresponding to said particular colour to form an image of the input filter elements on said layer of filter material; removing the unilluminated portions of said layer; and repeating said steps for each particular colour to form a multilayer output filter.

3. A method as claimed in claim 2 wherein each filter includes colour selective elements of three colours.

4. A method as claimed in claim 3 wherein the three colours are red, blue and green for the output filter.

5. A method as claimed in claim 3 wherein the three colours have wavelengths lying in the range 400 to 900 nanometers for the input filter.

* * * * *